United States Patent
Kuo et al.

(10) Patent No.: US 9,942,195 B2
(45) Date of Patent: Apr. 10, 2018

(54) NAT TRAVERSAL METHOD, COMPUTER-READABLE MEDIUM, AND SYSTEM FOR MEDIATING CONNECTION

(71) Applicant: VIVOTEK INC., New Taipei (TW)

(72) Inventors: Chia-Ming Kuo, New Taipei (TW); Wei-Tung Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 638 days.

(21) Appl. No.: 14/509,697

(22) Filed: Oct. 8, 2014

(65) Prior Publication Data
US 2015/0156167 A1    Jun. 4, 2015

(30) Foreign Application Priority Data
Nov. 29, 2013 (TW) .............................. 102143889 A

(51) Int. Cl.
*H04L 29/12* (2006.01)
(52) U.S. Cl.
CPC ...... *H04L 61/2589* (2013.01); *H04L 61/2575* (2013.01); *H04L 61/2514* (2013.01); *H04L 61/2517* (2013.01)
(58) Field of Classification Search
None
See application file for complete search history.

(56) References Cited

U.S. PATENT DOCUMENTS

| 6,870,845 B1* | 3/2005 | Bellovin ........... H04L 29/06027 370/389 |
| 2007/0171835 A1* | 7/2007 | Gobara ............. H04L 29/12509 370/248 |
| 2010/0182995 A1 | 7/2010 | Hwang et al. |

FOREIGN PATENT DOCUMENTS

TW    201029413 A    8/2010

OTHER PUBLICATIONS

Chinese Office Action dated Jun. 21, 2017 in application No. CN201410408724.

* cited by examiner

*Primary Examiner* — Jeffrey R Swearingen
(74) *Attorney, Agent, or Firm* — Maschoff Brennan

(57) ABSTRACT

Disclosed herein is a network address translation (NAT) traversal method. A node sends a first, second, and third detection message from a local port to a first, second, and third response server, respectively, in order to receive from the response servers a first, second, and third response message, which respectively include a first, second, and third proximal external port number (EPN). The node then deduces a rule for proximal EPNs based on the received ones. Also disclosed is a system for mediating connection. The system assists a first node on a network in NAT traversal and includes at least three response servers, which receive detection messages from the first node and send back response messages that include EPNs.

6 Claims, 2 Drawing Sheets

US 9,942,195 B2

NAT TRAVERSAL METHOD, COMPUTER-READABLE MEDIUM, AND SYSTEM FOR MEDIATING CONNECTION

CROSS-REFERENCE TO RELATED APPLICATIONS

This non-provisional application claims priority under 35 U.S.C. § 119(a) on Patent Application No. 102143889 filed in Taiwan, R.O.C. on Nov. 29, 2013, the entire contents of which are hereby incorporated by reference.

BACKGROUND OF THE INVENTION

Technical Field of the Invention

The present invention relates to the network address translation (NAT) methodology, particularly to a NAT traversal method and a system for mediating connection.

Description of the Related Art

The reason of the popularization of the network address translation (NAT) starts from the problem of insufficient address and uneven address distribution in the Internet Protocol version 4 (IPV4). Multiple hosts have to be disposed behind a router in the local network and share the public Internet Protocol (IP) address of the router when connecting to the external network. Conceptually, the NAT can be divided to four types: full-cone, address-restricted-cone, port-restricted-cone, and symmetric, wherein in the symmetric type NAT, when hosts in the local network use the same private IP address and port to send packets to different hosts outside the local network, they are also given different sets of public IP address and port in the router.

Generally, hosts in the local network do not have the authority to control the behavior of the gateway. Therefore, when a peer-to-peer communication traversing the NAT firewall is needed, precise prediction of the port dispatching rule of the NAT firewall to the external network and informing the other host the rule are the most important things. The known method needs to apply Session Traversal Utilities for NAT (STUN) protocol. However, the algorithm of STUN is very complex and does not apply to the symmetric NAT of common enterprise networks.

SUMMARY OF THE INVENTION

According the problem, the present invention provides a network address translation (NAT) traversal method, a computer-readable medium, and a system for mediating connection to reduce the prerequisite time of the traversal and eliminate the restrictions of the NAT types.

The present invention provides a NAT traversal method, and the steps comprises: sending a first detection message to a first response server from a local port, and receiving a first response message from the first response server, and the first response message comprising a first proximal external port number (EPN); sending a second detection message to a second response server from the local port, and receiving a second response message from the second response server, and the second response message comprising a second proximal EPN; sending a third detection message to a third response server from the local port, and receiving a third response message from the third response server, and the third response message comprising a third proximal EPN; and deducing a rule for proximal EPNs based on the first proximal EPN, the second proximal EPN, and the third proximal EPN.

The present invention provides a computer-readable medium having computer program codes for a processor to execute a plurality of instructions. The instructions comprises: sending a first detection message to a first response server from a local port, and receiving a first response message from the first response server, and the first response message comprising a first proximal EPN; sending a second detection message to a second response server from the local port, and receiving a second response message from the second response server, and the second response message comprising a second proximal EPN; sending a third detection message to a third response server from the local port, and receiving a third response message from the third response server, and the third response message comprising a third proximal EPN; and deducing a rule for proximal EPNs based on the first proximal EPN, the second proximal EPN, and the third proximal EPN.

The present invention provides a system for mediating connection for assisting a first node of a network for NAT traversal, and the system for mediating connection comprises at least three response servers. The response servers are respectively for receiving a detection message from the first node, and for sending a response message having an EPN to the first node according to the detection message.

In summary, by fixing the local port number and sending detection messages to at least three external hosts, the present invention can deduce the rule once for remote nodes to reckon the shift of the proximal EPNs, even if the proximal router adopts the symmetric NAT. When at least one of the two nodes in the network is affected by the NAT, the present invention can increase the probability of hole punching and building a connection successfully.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
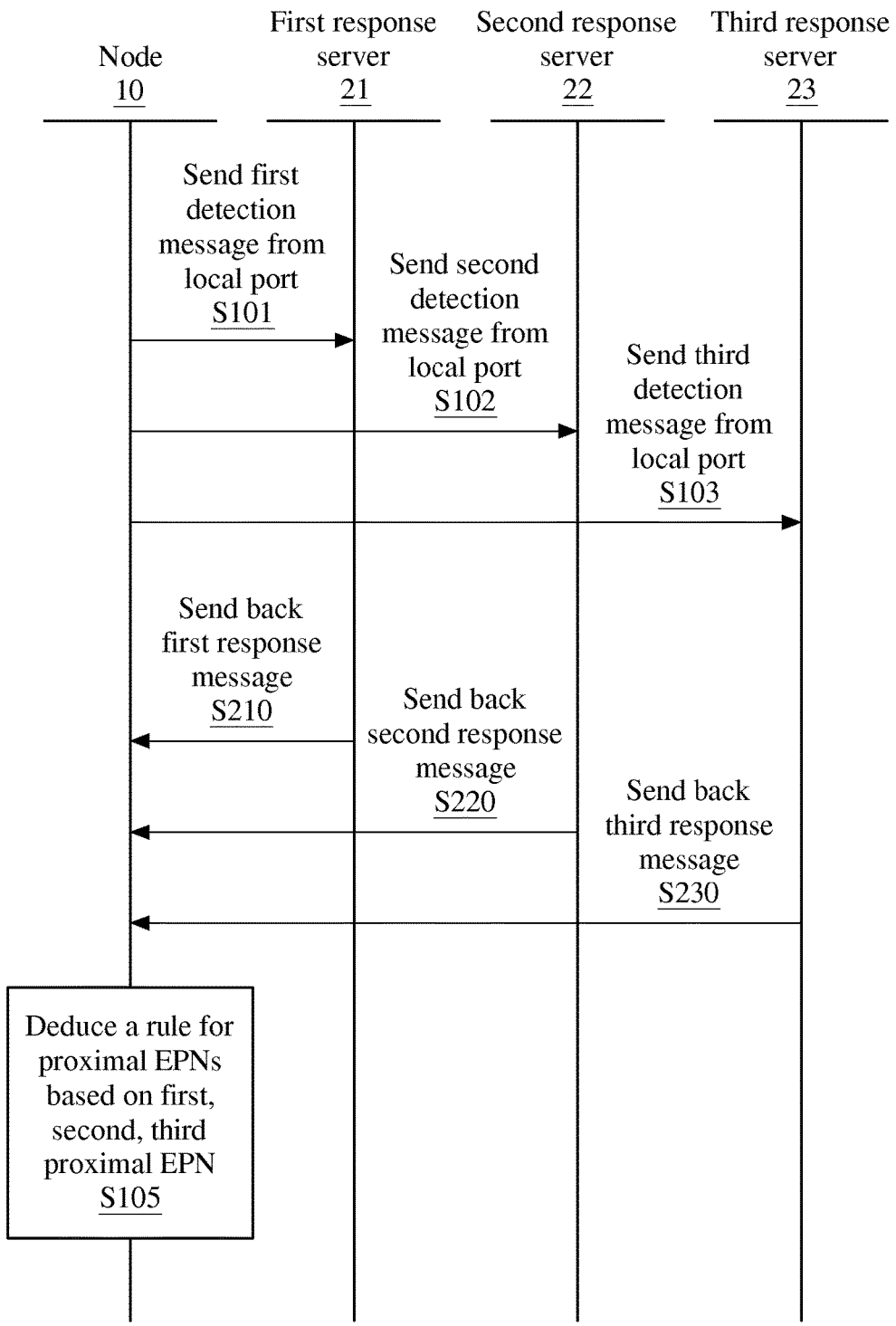
FIG. 1 is an interaction diagram between a node and respond servers according to an embodiment of the present invention.

Please refer to FIG. 1. FIG. 1 is an interaction diagram between a node and respond servers according to an embodiment of the present invention, especially related to the stage of the node 10 deducing the rule for proximal external port numbers (EPNs). The node 10 can be disposed behind the gateway or router in the private network, so that the node 10 is affected by a certain type of network address translation (NAT) and can actively connect to the external network (by router), but the node 10 can not know how it is accessed in the public network. The first response server 21, the second response server 22, and the third response server 23 are in the public network, and have public IP addresses, and can be accessed by any node. They can be separately real or virtual machines of the server array, or implemented as different processes in a single computer listening to the packets from different ports of the computer.

As shown in FIG. 1, in the step S101 to S103, the node 10 respectively sends the detection messages to the first response server 21, the second response server 22, and the third response server 23 from a certain local port P. The said router modifies the private IP address and the port number (such as 192.168.123.123:2013) of the node 10 in the source field of the detection message to the proximal IP address and a certain port number of the router in the public network. In the step S210, the first response server 21 fills the port number (modified by the router) of the source field of the first detection message in the first response message and sends back to the router, and the router forwards the first response message to the node 10. Therefore, the node 10 can obtain the first proximal EPN used by the router when sending the first detection message. In the step S220 and S230, the second response server 22 and the third response server 23 also execute similar operations. It is worthwhile to note that the known method is sending a plurality of detection messages to the same response server from different local ports. However, the present invention uses the same local port P to send detection messages to different response servers.

In the step S105, the node 10 deduces a rule for proximal EPNs according to the three received port numbers in the step S210 to S230. Assuming that the first response server 21, the second response server 22, and the third response server 23 have different IP addresses, and if the three port numbers are the same, then it reveals that the router does not adopt the symmetric NAT, and the rule of the port number is using a fixed port number; and if the three port numbers are different, generally the three port numbers forms an arithmetic progression by the symmetric NAT. For example, the first proximal EPN dispatched by the router can be 28500, and the second and the third port numbers are 28502 and 28504 respectively, so it is known that the router dispatches the port number by adding 2. In a better embodiment, the node 10 sequentially executes the step S101 to S103 in a short period to avoid other processes in the host corresponds to the node 10 or other nodes in the private network racing for the port numbers between the step S101 and S102 or between the step S102 and S103, so that the node 10 makes a misjudgment in the step S105. For example, if the first and second port number are 28500 and 28502 respectively, but port 28504 is occupied by other process, so that the third proximal EPN received by the node 10 in the step S230 is 28506. In an embodiment without assuming that the port numbers are an arithmetic progression, the node 10 possibly makes a misjudgment for identifying the port numbers dispatched by the router as an arithmetic progression or a geometric progression. In this example, the interval can be "2, 4, 6", "2, 4, 8", or random numbers generated by the router.

Figure 2:
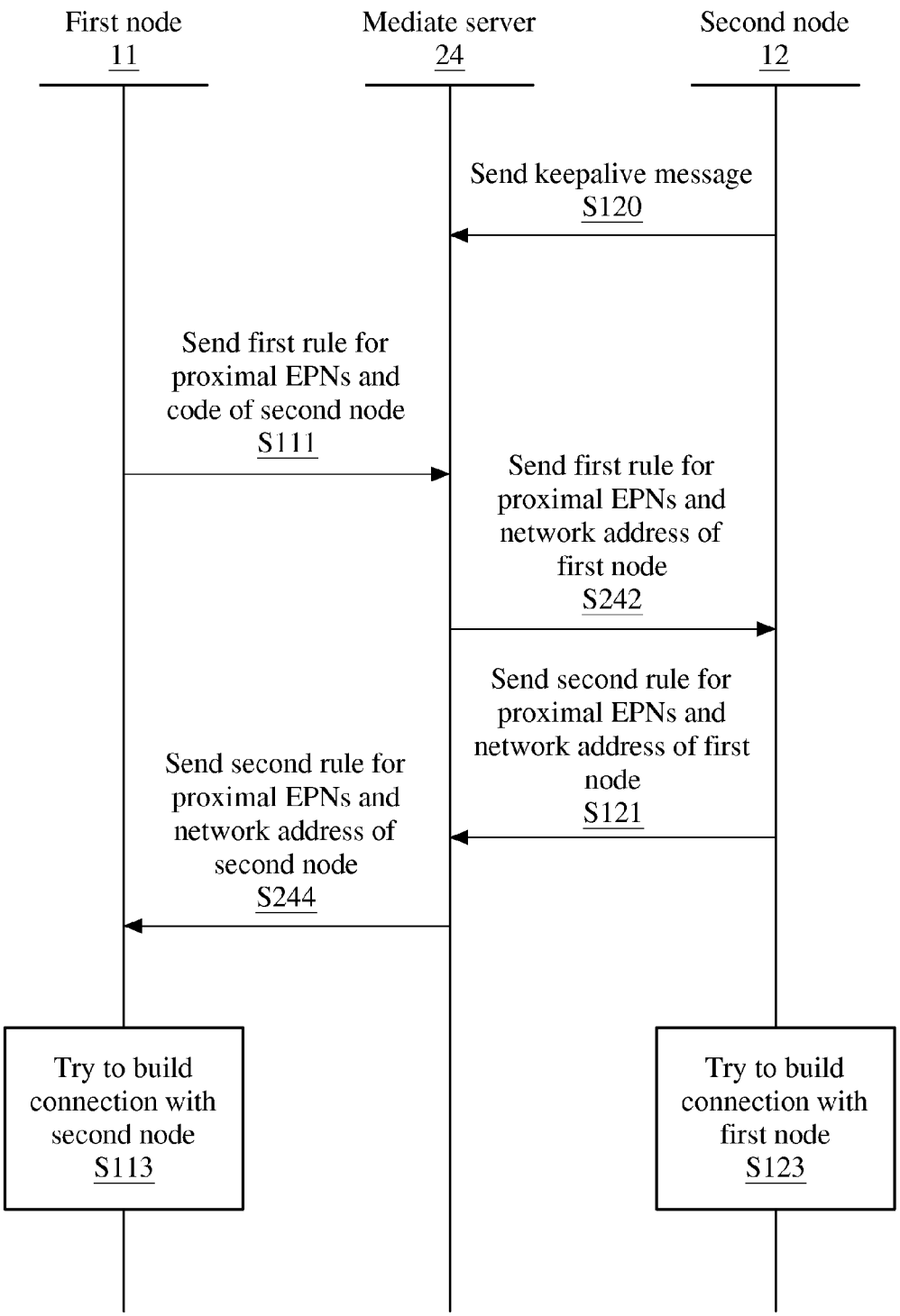
FIG. 2 is an interaction diagram between the first node, the second node, and a mediate server according to an embodiment of the present invention.

Please refer to FIG. 2. FIG. 2 is an interaction diagram between the first node, the second node, and a mediate server according to an embodiment of the present invention, especially related to the stage of building connections between the first node 11 and the second node 12. The second node 12 can be an IP camera, network video recorder, network video server, video management software (VMS), or any other device playing a server role in a client-server structure waiting for the first node 11 to connect to. Therefore, it is necessary for the second node 12 to repeat the step S210 to send a keepalive message to the mediate server 24, so that the mediate server can send information to the second node through the keepalive channel when needed (such as the step S242 described later). The period of repeating the step S120 is determined by the time limit of unused port numbers closed by the firewall of the router in the private network that the node 12 belongs to. The keepalive message can include all necessary information related to the connection, such as the code provided by the second node 12 to the mediate server 24 for identification. The first node 11 can be a cell phone or tablet in the mobile communication network, or any other home or enterprise terminal. The first node 11 and the second node 12 obtain the rules for proximal EPNs of themselves in advance respectively, by the flow as shown in FIG. 1. The rule deduced by the first node 11 is called the first rule, and the rule deduced by the second node 12 is called the second rule. Of course, the first node 11 and the second node 12 do not need to use the same response servers, and the mediate server 24 and the response servers can be implemented in the same real or virtual machine located in the same cluster or cloud structure, or independently existed in the public network. Even the function of the mediate server 24 corresponding to the step S120 can be extracted to different procedures, devices, and network links.

In the step S111, the first node 11 sends a first rule and a certain code for identifying the second node 12 to the mediate server 24. The code is not certainly the same with the code in the said keepalive message, but at least the two codes all represent the second node 12. Because the non-stop execution of the step S120 ensures the connection establishment between the mediate server 24 and the second node 12, the mediate server 24 can obtain the network address and the reference port number of the router of the first node 11 from the header, and after obtaining the first rule for EPNs of the first node 11 and knowing that the node to be connected is the second node 12 from the payload, the first rule and the network address of the first node can be forwarded to the second node 12 in the step S242. Please be noted that the so called network address can include both of the proximal external IP address and a certain reference port number of the first node 11, or the proximal external IP address only. The purpose of the reference port number is to provide a reference for the second node 12 to apply the first rule. For example, in the step S123, the second node 12 should try to build a connection using neighboring ports of the proximal EPN used when the first node 11 executes the step S111. If the first node 11 and the second node 12 designate the reference port number in advance, then the mediate server 24 does not need to inform the second node 12 the reference port number in the step S242.

In the step S121, the second node 12 expresses its willingness of connecting with the first node 11 to the mediate server 24. Specifically, the mediate server 24 identifies that the connection terminal to be accepted is the first node 11 by a code of the first node in the response message from the second node 12. Building a successful connection between the first node 11 and the second node 12 is still not guaranteed by now, but the mediate server 24 can individually communicate with the first node 11 and the second node 12. In the step S244, the mediate server 24 forwards the second rule and the network address of the second node to the first node 11. Similarly, the so called network address can include both of the proximal external IP address and a certain reference port number of the second node 12, or the proximal external IP address only. Please be noted that the step S111 corresponds to the step S121 and both steps are for sending the rule for EPNs of themselves and the code of the remote node. The step S242 corresponds to the step S244 and both steps are for receiving the rule and network address of the remote node. To the first node 11 and the second node 12, the order of these steps is only swapped and the practical implementation can use the same code or the same hardware. In other words, another scenario can be the first node 11 sending a keepalive message to the mediate server 24, and the second node 12 starting to execute the prerequisite steps to connect with the first node 11.

By now, the first node 11 and the second node 12 respectively has the connection information of each other (the rule for proximal EPNs and the network address), so they can try to build a connection with each other in the step S113 and S123 respectively. In the symmetric NAT, generally one of the steps S113 and S123 fails, but the failed connection makes the other connection succeed. For example, after the step S242, the second node 12 can send User Datagram Protocol (UDP) packets to the first node 11 according to the first rule and the network address of the first node 11 in the step S123. By now, the first node 11 possibly does not receive the information from the second node 12 in the step S244 and execute the step S113 accordingly, and the proximal router of the first node 11 considers that the packets from the second node 12 are uninvited and throws them away. However, when the first node 11 sends UDP packets to the second node 12 in the step S113, the proximal router of the second node 12 considers that the packets from the first node 11 are for responding to the message sent by the second node 12 in the step S123, and then the first successful connection between the first node 11 and the second node 12 is facilitated.

In summary, the response server in the system for mediating connection of the present invention can be provided for any network node to easily deduce the rule for EPNs of the router or gateway for accessing to the public network. In the condition that the physical network or the routing is unchanged, the process is an one-off task and not executed repeatedly. The nodes executing the flow of the invention as shown in FIG. 1 can save the detected rule for EPNs for later connections. The nodes executing the flow can periodically detect the condition of the physical network or the routing, and execute the flow again to obtain the newest rule for EPNs when the condition is changing (such as rebooting the router or the wireless access point). When the system for mediating connection further comprises a mediate server, the node can send keepalive messages to the mediate server and build direct connections with remote nodes through the mediate server by executing simple and efficient traversal steps.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A network address translation (NAT) traversal method, comprising:
    sending a first detection message passing through a router to a first response server from a local port, and receiving a first response message passing through the router from the first response server, and the first response message comprising a first proximal external port number (EPN);
    sending a second detection message passing through the router to a second response server from the local port, and receiving a second response message passing through the router from the second response server, and the second response message comprising a second proximal EPN;
    sending a third detection message passing through the router to a third response server from the local port, and receiving a third response message passing through the router from the third response server, and the third response message comprising a third proximal EPN;
    deducing a rule for proximal EPNs based on the first proximal EPN, the second proximal EPN, and the third proximal EPN; and
    building a connection with a remote node according to the rule for remote EPNs and the network address,
    wherein a port number of each of the first detection message, the second detection message and the third detection message is respectively modified, by the router, as the first proximal EPN, the second proximal EPN and the third proximal EPN added into the first response message, the second response message and the third response message by the first response server, the second response server and the third response server respectively.

2. The NAT traversal method of claim 1, further comprising:
    sending the rule for proximal EPNs and a code of the remote node to a mediate server; and
    receiving a rule for remote EPNs of the remote node and a network address of the remote node from the mediate server.

3. The NAT traversal method of claim 2, further comprising sending a keepalive message to the mediate server periodically.

4. A non-transitory computer-readable medium having computer program codes for a processor to execute a plurality of instructions, the instructions comprising:
    sending a first detection message passing through a router to a first response server from a local port, and receiving a first response message passing through the router from the first response server, and the first response message comprising a first proximal EPN;
    sending a second detection message passing through the router to a second response server from the local port, and receiving a second response message passing through the router from the second response server, and the second response message comprising a second proximal EPN;
    sending a third detection message passing through the router to a third response server from the local port, and receiving a third response message passing through the route from the third response server, and the third response message comprising a third proximal EPN;
    deducing a rule for proximal EPNs based on the first proximal EPN, the second proximal EPN, and the third proximal EPN; and building a connection with a remote node according to the rule for remote EPNs and the network address, wherein a port number of each of the first detection message, the second detection message and the third detection message is respectively modified, by the router, as the first proximal EPN, the second proximal EPN and the third proximal EPN added into the first response message, the second response message and the third response message by the first response server, the second response server and the third response server respectively.

5. The computer-readable medium of claim 4, wherein the instructions further comprises:

sending the rule for proximal EPNs and a code of the remote node to a mediate server; and receiving a rule for remote EPNs of the remote node and a network address of the remote node from the mediate server.

6. The computer-readable medium of claim 5, wherein the instructions further comprises sending a keepalive message to the mediate sever periodically.

\* \* \* \* \*